Jan. 2, 1923. 1,440,366
H. A. BALDWIN.
APPARATUS FOR ASSEMBLING BRICKS AND UNITS FOR BUILDING PURPOSES.
FILED APR. 11, 1922. 5 SHEETS-SHEET 1

Witnesses:-
Inventor
H. A. Baldwin

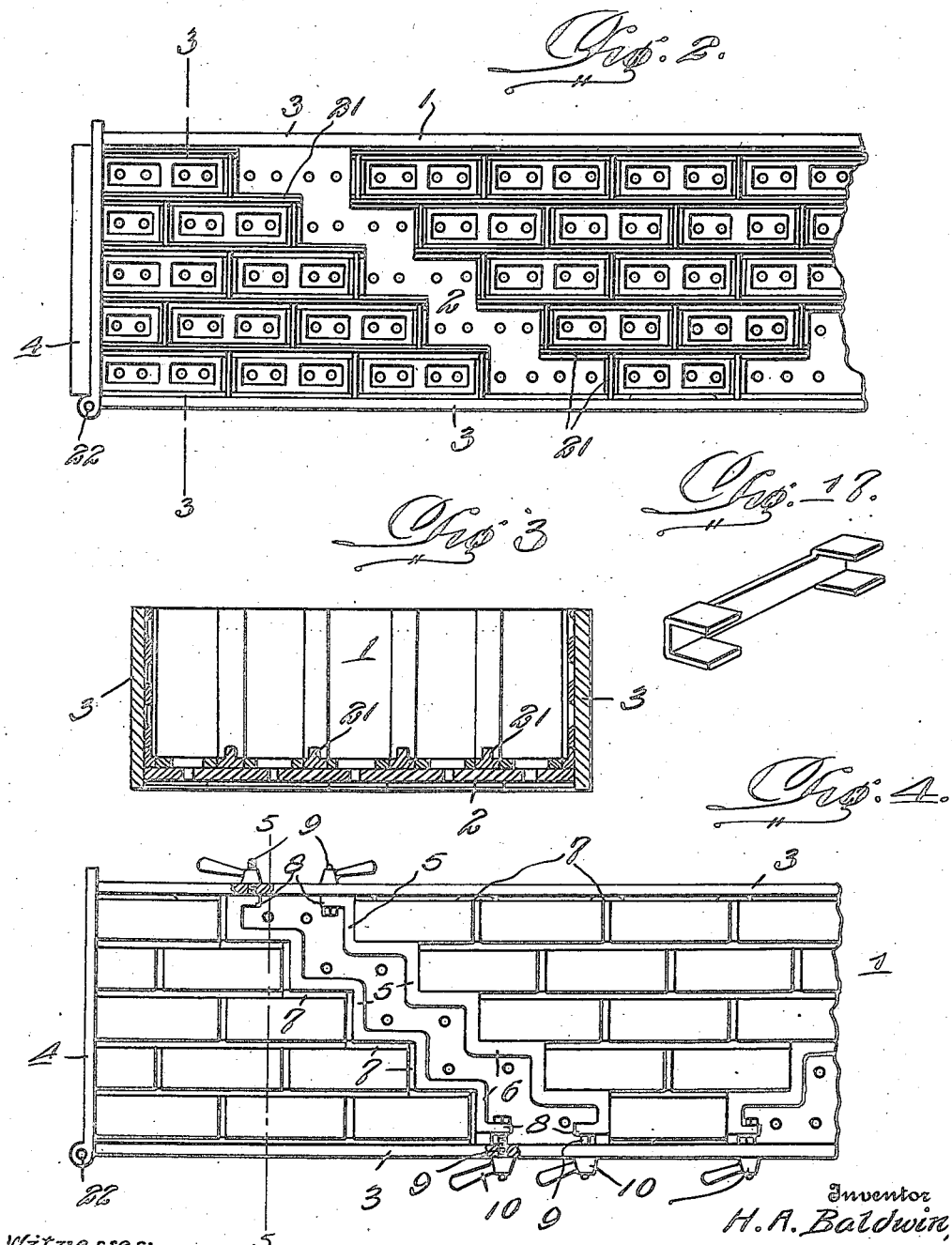

Jan. 2, 1923. 1,440,366
H. A. BALDWIN.
APPARATUS FOR ASSEMBLING BRICKS AND UNITS FOR BUILDING PURPOSES.
FILED APR. 11, 1922. 5 SHEETS-SHEET 3
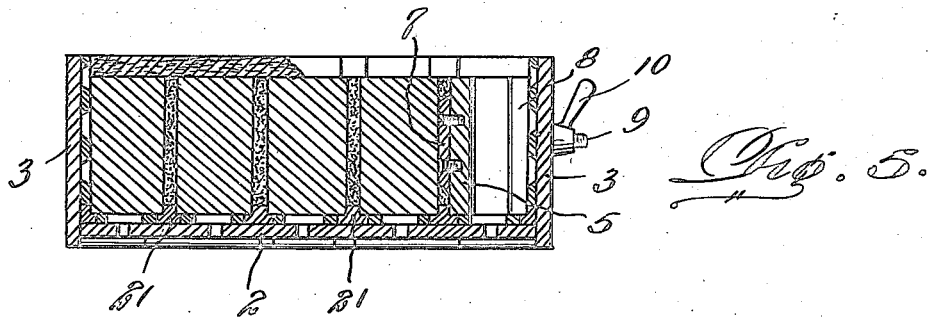
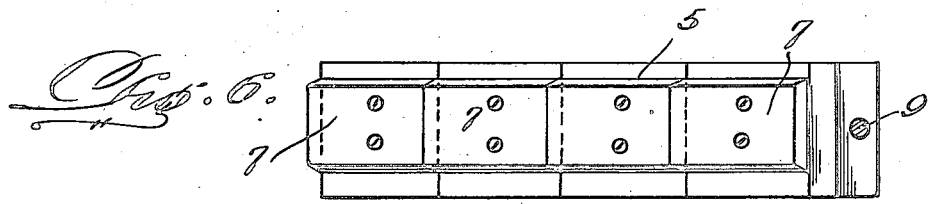
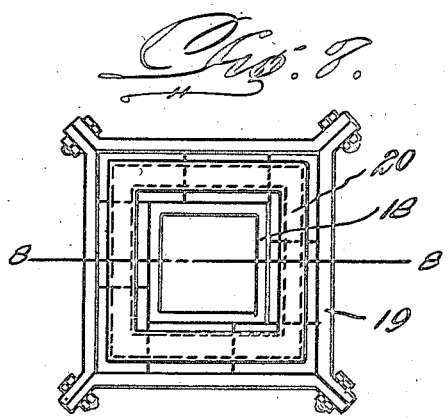
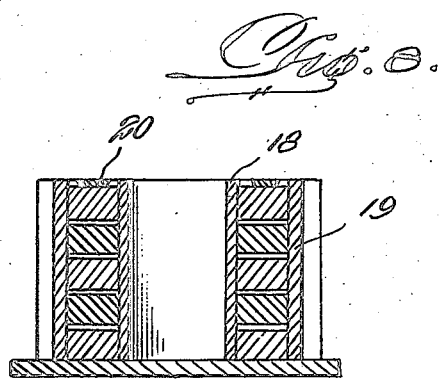
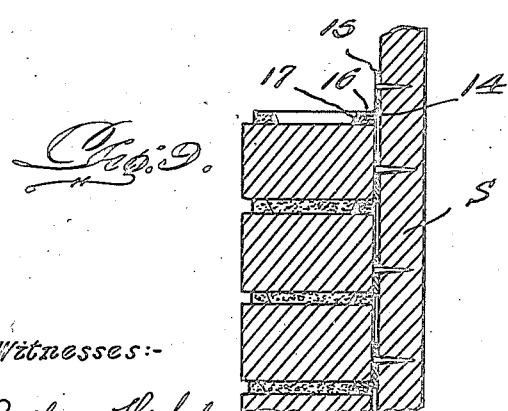
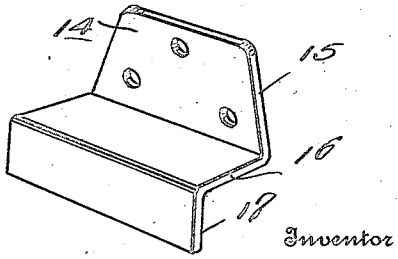
Witnesses:-
Inventor
H. A. Baldwin,
Attorney

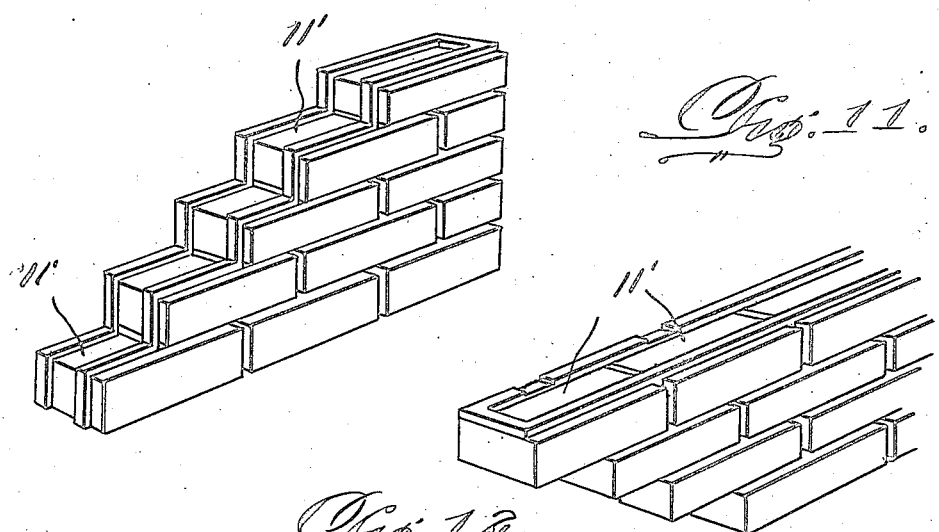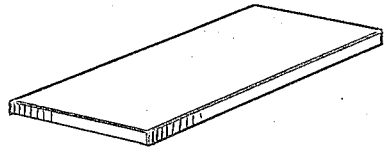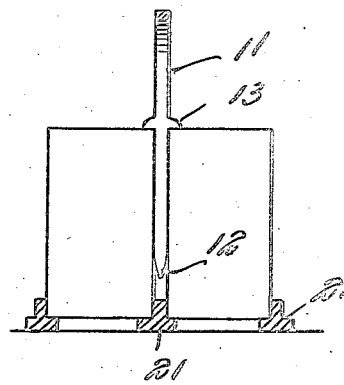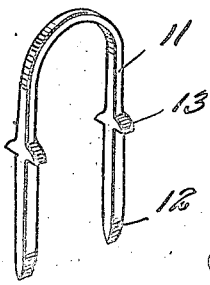

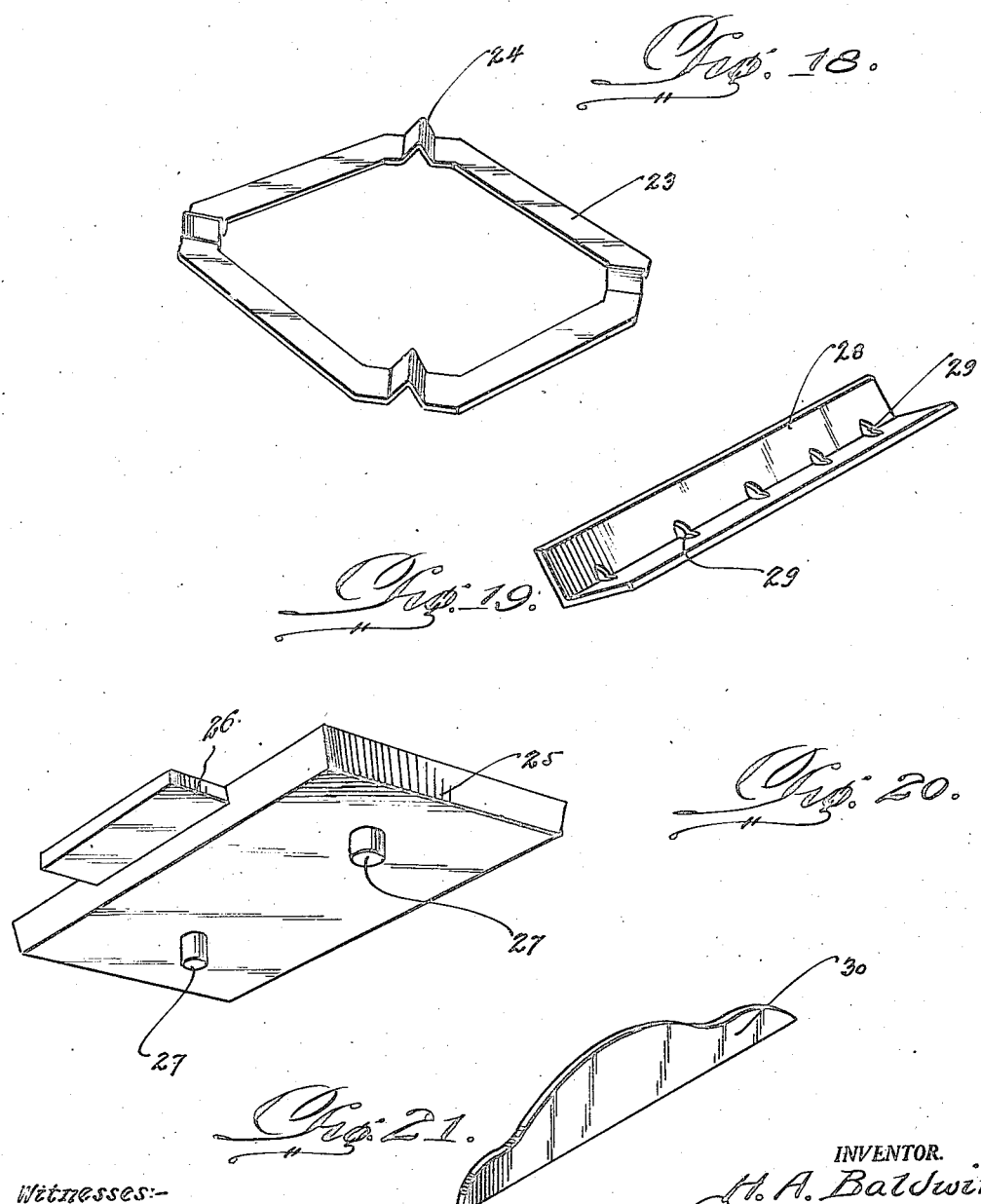

Patented Jan. 2, 1923.

1,440,366

UNITED STATES PATENT OFFICE.

HARRY A. BALDWIN, OF SOUTH GREENSBURG, PENNSYLVANIA.

APPARATUS FOR ASSEMBLING BRICKS AND UNITS FOR BUILDING PURPOSES.

Application filed April 11, 1922. Serial No. 551,442.

*To all whom it may concern:*

Be it known that I, HARRY A. BALDWIN, a citizen of the United States, residing at South Greensburg, in the county of Westmoreland and State of Pennsylvania, have invented new and useful Improvements in Apparatus for Assembling Bricks and Units for Building Purposes, of which the following is a specification.

In carrying out the present invention it is my purpose to provide a method of and apparatus for assembling bricks in units in such manner that the units may be assembled together to form a wall or other structure, and whereby the various units when assembled and associated together in structure formation will be effectively connected or sealed together so as to form a structure having the appearance of a wall or structure erected in the ordinary manner.

It is also my purpose to provide a method of and apparatus for assembling bricks in units for building purposes by means of which the average layman may erect a house or other structure in less time and with as much facility as a brick layer or other skilled mechanic.

Furthermore, I aim to provide a method and apparatus of the class described which will embrace the desired features of simplicity, efficiency and durability, which may be manufactured and carried out at small cost and which will enable the average layman to erect a brick structure without training.

Another object of my invention is the provision of a method of and apparatus for assembling bricks in units whereby the joints formed by the mortar at the face of the brick may be made in any shape or formation so that the desired ornamental effect may be given to the face of the wall or structure erected.

With the above recited objects in view, and others of a like nature, the invention resides in the construction, combination and arrangement of parts set forth in and falling within the scope of the appended claims.

In the accompanying drawings:

Figure 2 is a plan view of the form used for assembling the bricks in unit formation.

Figure 3 is a sectional view on the line 3—3 of Figure 2.

Figure 4 is a plan view of the form showing the bricks and end pieces in place.

Figure 5 is a sectional view on the line 5—5 of Figure 4.

Figure 6 is a plan view of one of the end pieces.

Figure 7 is a top plan view of the form used for erecting chimneys, pillars, etc.

Figure 8 is a cross sectional view on the line 8—8 of Figure 7.

Figure 9 is a fragmentary vertical sectional view through the bricks assembled and anchored to sheathing.

Figure 10 is a perspective view of one of the anchor plates for anchoring the brick unit to the sheathing.

Figure 11 is a fragmentary perspective view of a brick unit.

Figure 12 is a similar view showing the unit inverted so as to properly connect with the unit shown in Figure 11.

Figure 13 is a perspective view of a spacing block that may be used if desired.

Figure 14 is a side elevation of two bricks showing a spacer therebetween.

Figure 15 is a perspective view of the spacer used in Figure 14 and in assembling the bricks in unit formation.

Figure 16 is a cross sectional view showing two forms of joint forming elements for use in the form.

Figure 17 is a perspective view of a detail of the invention.

Figures 18, 19, 20 and 21 are perspective views of various details of the invention.

Figure 1:
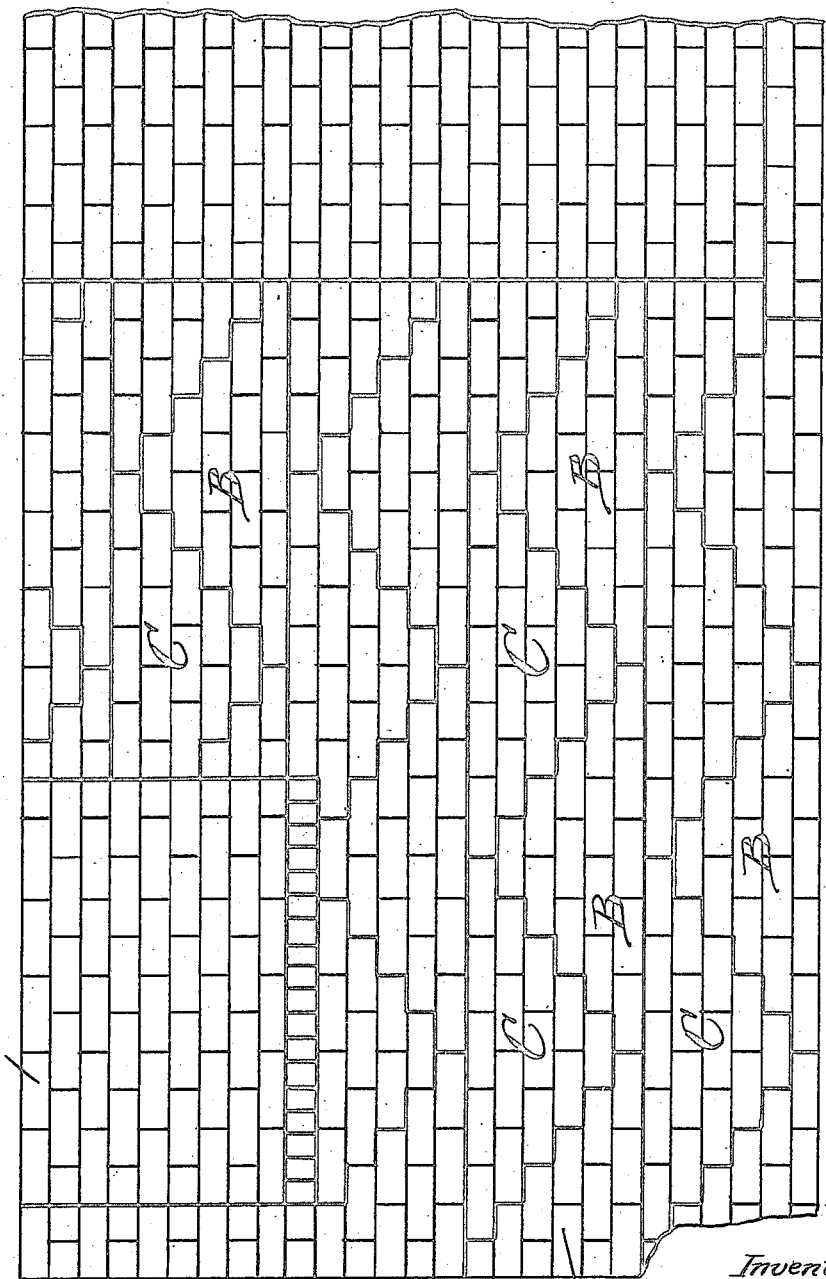
Figure 1 is a plan view of a chart by which my invention may be carried out.

Referring now to the drawings in detail, and particularly to Figure 1, A indicates a chart which I propose to furnish to those who build according to my invention and on which is depicted the structure that is to be erected. In the present instance I have shown a wall that is composed of units B and C, each unit being formed and then set into place and sealed to the companion units by mortar or cement as are the bricks of each unit. It will be noticed that the units C are inverted to the units B in order that a smooth unbroken surface will be presented. Of course provision is made for door and window openings and such other apertures as may be necessary or desired in the erection of the building or other structure, as shown at D in Figure 1, provision being also made for sills, abutments, etc.

In order to construct each unit I employ a form 1 embodying a bottom wall 2, side walls 3, end walls 4 and end sections or pieces 5 which are detachably secured to the side walls 3 as is more fully described hereinafter. This form is of such length that a desired number of units may be formed therein simultaneously and in Figure 2 I have shown a form wherein two units may be assembled, one being what I term an end unit and the other a central unit. One end of the end unit form is closed by the straight end wall 4 and the other end is closed by the end piece or section 5, while both ends of the central unit are closed by the end sections or pieces 5, as shown in Figure 4.

Each end section 5 comprises a sheet or strip of metal which is stepped as at 6 so that the end bricks in each row of the unit may be uniformly stepped in order to properly overlie the next lower brick in the companion section when the sections are set up in structure formation, as indicated on the chart in Figure 1. As shown on the chart the stepped bricks of the units B and the relatively long surfaces of the units C form top surfaces of the units: i. e. extend skyward and these skyward surfaces of the units are formed with sealing pockets so that all of the units may be securely and properly sealed together in the erection of the structure. The ends of each end section are formed with outturned lugs 8 equipped with bolts 9 that project through openings in the side walls 3 and are provided with locking nuts 10 by means of which the sections 5 may be locked in position in the form and whereby the sections 5 may be released when it is desired to remove the sections from the form.

In order to form these sealing pockets the side 3 of the form next to the skyward side of the unit and the end piece 5 next to the skyward end of the unit are provided with sealing pocket forming means which, in the present instance, are in the form of blocks 7 each of less cross and longitudinal dimensions than the adjacent surface of the brick.

In the practice of my invention the bricks are placed in the form with the face down and lie upon the bottom wall 2. The end pieces 5 are now locked in the form in proper position to engage the ends of the units and those end pieces or sections that lie adjacent to skyward portions of the bricks are equipped with the sealing blocks 7 as is also the side wall 3 that lies adjacent to the skyward surface of the units, as clearly illustrated in Figure 4. The bricks in each unit are now properly spaced apart so as to receive the cement or mortar and to so space the bricks I employ spacers, shown in Figures 14 and 15, each comprising, in this instance, a substantially U-shaped metal bar 11 having the legs pointed as at 12 and formed with stop lugs 13 a suitable distance from the pointed ends, the stop lugs acting to limit the movement of the spacers into the interstices between the bricks. The cement or mortar or other binding agent is now poured over the bricks in the form and such agent enters the interstices in the units, thereby uniting the bricks and after the mortar has set the bricks are securely held in unit formation and the unit may be assembled with other units to erect the desired structure. Before the binding agent sets the spacers are withdrawn and after the mortar has hardened the end pieces 5 are released and removed from the form and the units taken out, and owing to the sealing pocket forming blocks 7, sealing pockets 11, clearly shown in Figures 11 and 12, are provided in the skyward surfaces of the units. These pockets 11 are filled with cement, mortar or other binding agent in the erection of the structure, and the units then placed in proper fitting engagement with one another, as shown on the chart A, and the binding agent in the pockets acts to hold the units in structure formation.

If it is desired to secure the units to sheathing S so that a frame structure may be veneered with brick, anchor plates 14, each, in the present instance, formed with a sheathing engaging plate 15, a connecting web 16 and an anchoring flange 17, are secured in the binding agent between the bricks of the unit and are fastened to the sheathing as illustrated in Figures 9 and 10 of the drawings.

In Figures 7 and 8 I have shown a form for the building of units that may be employed in the erection of chimneys, columns, etc., and in the present embodiment this form comprises a core 18 and an outer casing 19 between which and the core the bricks are placed in rows one upon the other with mortar, cement or the like between the rows to bind the same in unit formation. On the top row is the sealing pocket forming strip 20.

In Figure 16 I have shown two forms of joint forming strips 21. It will of course be understood that the joint forming strips may be of any desired shape and in the use of the joint forming strip the latter is placed upon the bottom wall 2 of the form, as shown in Figures 2 and 3, in order that a mortar joint of the desired ornamentation may be formed on the face of the brick unit.

In Figure 13 I have shown one form of spacing plate that may be used in the event that it is desired to hold the bricks spaced apart from the bottom of the form for any reason, as when it is desired to make provision for the coating of the units with plaster, and in Figure 17 I have shown another form of spacer that may be used if desired.

In the present form of my invention the end wall 4 is hinged as at 22, so that the said wall may be swung out from the form if found necessary.

In Figure 18 I have shown a spacer that is used in connection with my apparatus for assembling bricks in units, and in this form of my invention the spacer comprises a substantially rectangular shaped metal strip 23 formed at its corners with upstanding inverted V-shaped portions 24. This spacer is used when it is desired to make provision for lattice work around porches, etc.

In Figure 20 I have shown what I term a combined joint spacer and mortar release which is preferably used in forming columns, chimneys, etc. This spacer and mortar relase is similar in construction to the ceiling pocket forming piece 7 hereinbefore described and is designed for use upon the skyward surfaces of the units that are formed for columns, chimneys, etc. In the present instance this combination joint spacer and mortar release comprises a spacing block 25 formed at one edge centrally of the ends of such edge with a tongue 26 and provided on its upper surface with pins 27. When the block 25 is set in position on the unit previous to the pouring of the cement or mortar, the tongue 26 terminates flush with the outer surface of the brick and after the cement has hardened a release opening is provided, as shown in Figure 11, so that when the companion unit is set on the lower unit the mortar within the sealing pocket may be pressed downwardly and forced out through the release opening formed by the tongue 26 and then flushed off with a trowel or other instrument.

In Figure 19 I have shown what I term a sealing pocket forming pad which is in the form of a strip of metal 28 bent longitudinally into V-shape and formed at its apex with release apertures 29 appropriately spaced apart.

In Figure 21 I have shown a steel strike-off piece 30 which is to be utilized when one surface of the brick unit is to be faced with plaster.

From the foregoing description, taken in connection with the accompanying drawings, it will be seen that I have provided a method and means whereby brick units may be built up and subsequently assembled, and whereby sealing pockets may be formed in the units so that in the assembling of the units each may be securely sealed or fastened to the other and whereby mortar joints on the face of the brick may be formed in such manner as to give the desired ornamental appearance.

I claim:

1. A form for assembling bricks in unit formation with the ends of the rows of bricks at one end of the form stepped, comprising a bottom wall upon which the bricks are adapted to be placed with the face down, an end piece stepped to fit the corresponding end of the unit, and means carried by said end piece to form sealing pockets on those surfaces of the bricks that face skyward.

2. A form for assembling bricks in unit formation with the ends of the rows of bricks at one end of the form stepped, comprising a bottom wall upon which the bricks are adapted to be placed with the face down, an end piece stepped to fit the corresponding end of the unit, means carried by said end piece to form sealing pockets on those surfaces of the bricks that face skyward, and a detachable connection between said end piece and the form.

3. A form for assembling bricks in unit formation with the ends of the rows of bricks at one end of the form stepped, comprising a bottom wall upon which the bricks are adapted to be placed with the face down, an end piece stepped to fit the corresponding end of the unit, means carried by said end piece to form sealing pockets on those surfaces of the bricks that face skyward, and a detachable and adjustable connection between said end piece and said form.

In testimony whereof I affix my signature.

HARRY A. BALDWIN.